United States Patent Office 3,395,018

Patented July 30, 1968

3,395,018

LIGHT-SENSITIVE COLOR-FORMING COMPOSITION

Robert Emms Read, Newark, Del., assignor to E. I. du Pont de Nemours and Company, Wilmington, Del., a corporation of Delaware No Drawing. Filed Apr. 29, 1964, Ser. No. 363,638

8 Claims. (Cl. 96—90)

ABSTRACT OF THE DISCLOSURE

A light-sensitive composition of (a) a 10-acyl-aminophenoxazine 10-acyl-aminophenothiazine, or a 10-acyl-amino-dihydrophenazine, and (b) a non-volatile, nitrogen-containing photooxidant. Upon light activation, the photooxidant oxidizes component (a) to produce a color change in (a). Image-forming compositions can therefore be obtained by applying the above composition to a suitable substrate from solution.

This invention is directed to novel light-sensitive compositions and to a novel process for forming a colored material from an essentially colorless one by irradiation with ultraviolet light. More particularly, the present invention is directed to a composition comprising an intimate admixture of a 10-acyl-aminophenoxazine, 10-acyl-aminophenothiazine, or a 10-acyl-aminodihydrophenazine and of a selected non-volatile, nitrogen-containing compound which functions as a photooxidant. Upon irradiation with a pattern of ultraviolet light, this novel composition quickly and significantly undergoes a color change to form a clear image.

Image-forming compositions and processes play an essential part in photography, thermography, and related arts dealing with processes of writing, printing, and producing images with the aid of light, heat, electricity, or combinations of these activating influences. Currently available methods of image production imposed numerous limitations which are costly, inconvenient, time-consuming, and sometimes potentially hazardous.

The compositions of the present invention are unique in that they do not have a hydrogen which is removed in the color-forming step. The color-generator of the present composition is an acyl derivative of a secondary amine. It is indeed surprising to find that these acyl derivatives can be oxidized to a colored species in view of U.S. Patent 3,082,086 which discloses deactivation of photosensitive compositions by acylation of the amine color-generator.

It is, therefore, an object of this invention to provide a new composition, a novel one, which is sensitive to ultraviolet light and which forms permanent color when irradiated. Another object is to provide such a composition which forms a permanent colored image when irradiated in a graphic pattern. A still further object is to provide a photosensitive paper which can be imaged by irradiation with light in a graphic pattern. Yet another object is to provide a novel process for forming a colored material from an initially colorless one by irradiation with ultraviolet light as more specifically described and claimed.

These and other objects of the invention will be apparent from the following description and claims.

More specifically, the present invention is directed to a light-sensitive composition comprising an intimate admixture of (1) a leuco dye having the formula

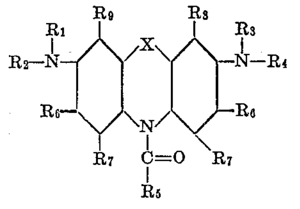

wherein $R_1$, $R_2$, $R_3$ and $R_4$ are $C_1$ to $C_4$ alkyl, phenyl or benzyl and may be alike or different; $R_5$ is $C_1$ to $C_{18}$ alkyl, $C_1$ to $C_5$ alkoxy, 2-furyl, 2-thienyl, aryl, or aryl bearing one or two substituents selected from the group consisting of bromine, chlorine, fluorine, cyano, nitro, alkyl, alkylthio, alkoxy, alkoxycarbonyl, alkanoyl, alkanoyloxy, alkanamido, alkylsulfamoyl, benzyl, benzoyl, phenyl, phenoxy, and phenylthio, said alkyl and "alk" groups containing one to five carbon atoms; $R_6$ and $R_7$ are hydrogen or methyl or such groups that when taken together, $R_6$ and $R_7$ form a benzo ring; $R_8$ and $R_9$ are hydrogen, methyl or nitro; and X is O, S, or N-$R_{10}$ where $R_{10}$ is ethyl, methyl or phenyl and (2) a non-volatile, nitrogen-containing photooxidant of such a character that the defined leuco dye of (1) and the photooxidant produce color when about 10 mgs. of each of these compounds are mixed together in 10 ml. of a 50:50 mixture of ethanol and N,N-dimethylformamide in a quartz vessel and irradiated with light having a wavelength of from about 2000 A. to about 4200 A.

Another embodiment of this invention is a light-sensitive product comprising a supporting base carrying a light-sensitive composition as just defined.

A preferred product is paper treated with a composition as defined above.

A preferred composition is that wherein the leuco dye is 10-benzoyl-3,7-bis(dimethylamino)phenothiazine and the photooxidant is a dimer of 2-(o-chlorophenyl)-4,5-diphenylimidazolyl.

This invention is also directed to a process for forming a colored material which comprises irradiating the light-sensitive composition as heretofore defined wth light having a wavelength of from about 2000 A. to about 4200 A.

Representative leuco dyes which contribute the coloring component to the light-sensitive compositions of the present invention are acylated derivatives of the following representative compounds.

Phenoxazines (X of the preceding leuco dye structure=O)

3,7-bis(dimethylamino)phenoxazine
3,7-bis(diethylamino)phenoxazine
3,7-bis(dibutylamino)phenoxazine
3-diethylamino-7-dimethylamino-2-methylphenoxazine
3-dimethylamino-7-dipropylaminophenoxazine
5-dimethylamino-9-diethylamino-12H-benzo[a]-phenoxazine
5-dibenzylamino-9-diethylamino-12H-benzo[a]-phenoxazine
5,9-bis(diethylamino)-12H-benzo[a]phenoxazine Phenothiazines (X of the preceding leuco dye structure =S)

3,7-bis(dimethylamino)phenothiazine
3,7-bis(dimethylamino)-4,6-dimethylphenothiazine
3,7-bis(diethylamino)-2,8-dimethylphenothiazine
3,7-bis(dimethylamino-4-nitrophenothiazine
3,7-bis(dibutylamino)phenothiazine
3-diethylamino-7-dimethylaminophenothiazine
3-dimethylamino-7-N-benzyl-N-methylaminophenothiazine
3,7-bis(N-benzyl-N-ethylamino)phenothiazine Dihydrophenazines (X of the leuco dye strutcure heretofore defined =N—$R_{10}$ 3,7-bis(dimethylamino)-5,10-dihydro-5-phenylphenazine
3,7-bis(diethylamino)-5,10-dihydro-2,8-dimethyl-5-phenylphenazine
3,7-bis(dimethylamino)-5,10-dihydro-5-methylphenazine
3,7-bis(dimethylamino)-5-ethyl-5,10-dihydrophenazine
3,7-bis(dipropylamino)-5,10-dihydro-5-phenylphenazine
3-dimethylamino-7-diethylamino-5,10-dihydro-5-methylphenazine
5,9-bis(diethylamino)-7,12-dihydro-7-phenyl-benzo[a]phenazine The preceding phenoxazines, phenothiazines, and dihydrophenazines are acylated at the hetero nitrogen atom by reaction with an acyl halide, anhydride of an organic acid or alkyl halocarbonate. Suitable acylating agents include acetic anhydride, benzoic anhydride, acetyl chloride, butyryl chloride, octanoyl chloride, lauroyl chloride, stearoyl chloride, 2-furoyl chloride, 2-thienyl carbonyl chloride, benzoyl bromide, benzoyl chloride, 2-bromo-4-nitrobenzoyl chloride, 4-fluorobenzoyl chloride, 2-chloro-4-cyanobenzoyl chloride, 3,5-dimethylbenzoyl bromide, 4-benzylthiobenzoyl chloride, 4-benzyloxybenzoyl chloride, 2-propylthio-4-benzylbenzoyl chloride, 4-phenylbenzoyl chloride, 2-phenoxybenzoyl chloride, 4-phenylthiobenzoyl chloride, 4-pentoxybenzoyl bromide, 4-methoxycarbonylbenzoyl chloride, 4-acetoxybenzoyl chloride, 2-acetamidobenzoyl chloride, 4-ethylsulfamoylbenzoyl chloride, 4-acetylbenzoyl chloride, 1-naphthoyl chloride, 1-methoxy-2-naphthoyl chloride, methyl chlorocarbonate, pentyl chlorocarbonate. The method of acylating the above compounds at the heterocyclic nitrogen is described in U.S. Patent 2,909,520.

Non-volatile, nitrogen-containing photooxidants which are utilized in the light-sensitive compositions of this invention include the following compounds:

(a) 2,4,5-triarylimidazolyl dimers which undergo homolytic dissociation upon exposure to light of wavelength between 2000 A. and 4200 A. to form two 2,4,5-triarylimidazolyl free radicals. Each free radical is represented by the formula

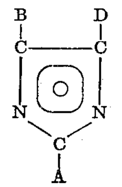

and has as an essential part of its structure one and only one unpaired electron which is delocalized throughout the conjugated triarylimidazolyl system. In the formula A represents the group

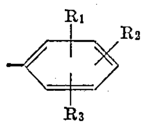

wherein $R_1$, $R_2$ and $R_3$ are hydrogen atoms or substituents free from a hydrogen atom capable of reacting with methyl magnesium iodide. Two of the R groups in adjacent positions on the phenyl ring when taken together may form a benzene ring. B and D are phenyl or phenyl substituted with up to three of the substituents $R_1$, $R_2$ and $R_3$ as already defined.

Additional representative dimers of imidazolyl free radicals other than those given in the examples which fall within the scope of the invention are the dimers of the following free radicals.

2-(p-benzylthiophenyl)-4,5-diphenylimidazolyl
2-(m-bromophenyl)-4,5-diphenylimidazolyl
2-(p-bromophenyl)-4,5-bis(p-methoxyphenyl)imidazolyl
2-(2,4-dichlorophenyl)-4,5-diphenylimidazolyl
2-(p-cyanophenyl)-4,5-bis(p-methoxyphenyl)imidazolyl
2-(o-ethoxyphenyl)-4,5-diphenylimidazolyl
2-(p-iodophenyl)-4,5-diphenylimidazolyl
2-(m-fluorophenyl)-4,5-diphenylimidazolyl
2-(4-trifluoromethoxycyclohexyl)-4,5-diphenylimidazolyl
4,5-bis(p-methoxyphenyl)-2-(2,4-dichlorophenyl)imidazolyl
2-(2,3-dimethoxyphenyl)-4,5-diphenylimidazolyl
2-(2,4-dimethoxyphenyl)-4,5-diphenylimidazolyl
2-(3,4-methylenedioxyphenyl)-4,5-diphenylimidazolyl
2-(p-methylthiophenyl)-4,5-diphenylimadazolyl
2-(2-naphthyl)-4,5-diphenylimidazolyl
2-(m-nitrophenyl)-4,5-diphenylimidazolyl
2-(p-nitrophenyl)-4,5-bis(p-methoxyphenyl)imidazolyl
2-(4-chloro-1-naphthyl)-4,5-diphenylimidazolyl
2,4,5-triphenylimidazolyl
2-phenyl-4,5-di(2,4-xylyl)imidazolyl In general the substituents in the phenyl rings of the imidazolyl dimers which are free from a hydrogen atom capable of reacting with methyl magnesium iodide to yield methane include alkyl, alkoxy, alkoxycarbonyl, alkylthio, dialkylcarbamoyl, dialkylsulfamoyl, alkanoyloxy, N-alkylalkanamido, aryl, aryloxy, arylthio, benzo, halogen, cyano and nitro groups. The alkyl groups of these substituents including the alkoxy substituents can be of any chain length, preferably being lower $C_1$ to $C_5$ alkyls. Examples of undesirable groups are hydroxyl, thiol, carboxyl, amino and alkylamino.

The above dimers are prepared from triarylimidazoles corresponding to the imidazolyls. The triarylimidazoles are prepared by reacting benzil or a substituted benzil with benzaldehyde or a substituted benzaldehyde as described by Davidson et al., J. Org. Chem. 2, 319 (1937) or as shown in Belgian Patent No. 589,417. The intermediate triarylimidazoles are then oxidized to the dimers with potassium ferricyanide as described by Hayashi et al., Bull. Chem. Soc., Japan, 33, 565 (1960).

(b) Bibenzotriazoles represented by 1,2′-bibenzotriazole; 5,5′-dichloro-1,1′-bibenzotriazole and 5,5′-dimethyl-1,1′-bibenzotriazole. Additional illustrations of bibenzotriazoles which may be used are:

tetranitro-1,2′-bibenzotriazole
4′-chloro-1,2′-bibenzotriazole
5′-bromo-5-fluoro-1,2′-bibenzotriazole
5-chloro-4′,6′-dimethyl-1,2′-bibenzotriazole
1,1′-bibenzotriazole
dinitro-1,1′-bibenzotriazole
sulfo-1,1′-bibenzotriazole
acetamido-1,1′-bibenzotriazole
benzamido-1,1′-bibenzotriazole.

1,2′-bibenzotriazole and benzo ring substituted 1,2′-bibenzotriazoles except those having a nitro substituent are prepared by reacting a solution of the benzotriazole in aqueous sodium hydroxide with hydroxylamine-O-sulfonic acid to form a corresponding 2-aminobenzotriazole which is separated from its isomer by fractional crystallization. The 2-aminobenzotriazole is then mixed with o-chloronitrobenzene and heated to 160° to 205° C. for 5 hours in the presence of anhydrous sodium acetate to produce 2-(o-nitrophenylamino)benzotriazole. The product is isolated by filtration and recrystallized from ethanol. The 2-(o-nitrophenylamino)benzotriazole is catalytically reduced with hydrogen to 2-(o-aminophenylamino)benzotriazole. The 2-(o-aminophenylamino)benzotriazole is diazotized in the usual way with nitrous acid to convert the primary amine to a diazonium salt which couples with the secondary amino group to form a triazole ring and yield a 1,2′-bibenzotriazole.

The nitro derivatives cannot be prepared by this procedure because the reduction step converts to primary amine any nitro group in addition to that required in the ortho position. This leads to loss of the nitro group and to complication in subsequent diazotization step. Nitro derivatives of 1,2′-bibenzotriazole are produced by treatment of the bibenzotriazole with nitric acid.

The 1,1′-bibenzotriazole and derivatives are prepared by tetraazotizing with nitrous acid o,o′-diaminoazobenzene or its derivatives to bisdiazonium salts. The resultant salts are then reduced to the 1,1′-bibenzotriazole with sulfur dioxide. Derivatives bearing such substituents as alkyl, halogen, sulfo, nitro, or alkanamido are prepared from the correspondingly substituted o,o′-diaminoazobenzene.

(c) Diacylaminobenzotriazoles represented by 1-diacetylaminobenzotriazole and 1-benzoylamino-5-chlorobenzotriazole. (Chemical Abstracts 55, 9382 (1961).)

(d) Diacylaminopyrazoles such as 1-diacetylaminopyrazole and 1-dipropionylamino-4-chloropyrazole.

Additional illustrative diacylaminopyrazoles are:

1-(diacetylamino)-4-methylpyrazole
1-(dibutyrylamino)-4-nitropyrazole
1-(diacetylamino)-3,5-dicyanopyrazole
1-(dibenzoylamino)-3,5-dibromopyrazole.

The diacylaminopyrazoles which may be used as photooxidants in this invention are prepared by reacting pyrazole or pyrazole substituted in one or more of the 3-, 4-, or 5-positions with alkyl, halogen, aryl, nitro or cyano with hydroxylamine-O-sulfonic acid in aqueous sodium hydroxide solution to form a 1-aminopyrazole. The 1-aminopyrazole is then reacted with the necessary acid anhydride or acid halide to form the corresponding 1-diacylaminopyrazole.

(e) Tetraacylhydrazines such as:

tetraacetylhydrazine
tetraformylhydrazine
tetrabenzoylhydrazine (f) Tetraarylhydrazines such as:

tetraphenylhydrazine
tetra-p-tolylhydrazine (g) Benzothiazole disulfides represented by:

bis(2-benzothiazolyl) disulfide
bis(6-methoxy-2-benzothiazolyl)-disulfide (h) Triacylhydroxylamines such as:

N,N,O-triacetylhydroxylamine
N,N,O-tripropionylhydroxylamine
N,N,O-tribenzoylhydroxylamine
N,N,O-tri-p-chlorobenzoylhydroxylamine Compositions prepared in the practice of this invention utilizing the heretofore defined leuco dyes and nitrogen-containing photooxidant may be observed and identified in the following manner. About 10 mgs. of both leuco dye and the photooxidant candidate are added to about 10 mls. of a solution of equal parts by volume of N,N-dimethylformamide and ethanol contained in a quartz vessel. The solution is stirred to insure that at least a portion of each of the added solid materials dissolves. The resultant solution is then irradiated with light having a wavelength from about 2000 A. to about 4200 A. The formation of an intense color in the solution indicates a light-sensitive composition.

Other solvents and combinations of solvents may be used with particular compositions. However, the above combination of solvents has been found to be applicable to the entire range of compounds which are useful in the practice of the present invention.

The compositions of the present invention may be applied to substrates such as paper or film to provide a photosensitive sheet on which an image may be formed by exposure to ultraviolet light in a graphic pattern. It has been found that better results are obtained when the paper or film retains some of the solvent.

The statement that "solvent" be retained by the substrate, paper for instance, is not meant to convey the idea that the paper must necessarily be wet, humidified or otherwise specially handled. Such solvents as N,N-dimethylformamide, N,N-diethylacetamide, dimethylsulfoxide are so strongly adsorbed by cellulosic and plastic substrates that prolonged heating under vacuum is necessary for complete solvent removal. Ordinary drying such as that employed in paper manufacture or in film casting results in the retention of ample solvent to give a composition with good photosensitivity. The compositions so produced are definitely dry to the touch and stable to storage at room temperature.

Some solvents, such as methanol, ethanol and the like, may be removed from cellulosic materials readily and completely enough to reduce the photosensitivity of the composition to undesirably low levels. When such combinations of solvents-substrates are employed, images having the highest optical density are formed only when the substrate is wet to the touch. Such solvents are best used in applications which permit storage of the treated paper under conditions which prevent solvent evaporation. When an image is being formed on a wet substrate solvents of this type may be used with the advantage that simple drying retards color formation in uncolored areas. In general, a solvent should dissolve at least some of both the photooxidant and color-generator. It should not, of course, react with the photosensitive materials.

In general, a preferred solvent has a boiling point of at least 60° C. at atmospheric pressure. Solvents with low vapor pressures and consequent high boiling points may be used. Their failure to be readily removed by evaporation will not present a problem, if the quantity used is restricted, as it readily can be in mixtures of solvents with relatively high vapor pressures. It is preferable to have at least 0.5% by weight of solvent retained by such a substrate as paper to ensure optimum image formation upon proper radiation. Among the solvents which have been and may be employed on paper are formamide, N,N-dimethylformamide, N,N-dimethylacetamide, hexanamide, stearamide, methanol, ethanol, 1-propanol, 2-propanol, butanol, ethylene glycol, polyethylene glycols, ethyl acetate, ethyl benzoate, benzene, o-dichlorobenzene, toluene, dimethylsulfoxide, pyridine, tetrahydrofuran, dioxane, dicyanocyclobutane, 1-methyl-2-oxohexamethylenimine, and mixtures of these solvents in various proportions as may be required to attain solution of the particular photooxidant and color-generator selected for use in the photosensitive composition.

In addition to a residual amount of a solvent a binder may be present in the light-sensitive composition spread over a substrate. Binders which may optionally be added to the composition are inert materials that serve to adhere the photosensitive mixture to a substrate. The binder may also serve to thicken the solution of the composition should this be desirable for the specific applications. Representative binders that will be found applicable are ethyl cellulose, polyvinyl alcohol, polyvinyl choride, polystyrene, polyvinyl acetate, polymethyl methacrylate, cellulose acetate, cellulose nitrate, chlorinated rubber, polymers and copolymers of vinyl monomers, gelatin. The solution containing a binder in addition to the subject photosensitive composition can be cast, extruded or otherwise formed into unsupported films. These films may be imaged similarly to the foregoing impregnated compositions.

The substrates are materials to which the light-sensitive, image-forming compositions may be applied as a coating or impregnant. They are materials commonly used in the graphic arts and in decorative applications. These materials include paper ranging from tissue paper to heavy cardboard; films of plastics and polymeric materials such as regenerated cellulose, cellulose acetate, cellulose nitrate, polyesters of glycol and terephthalic acid, vinyl polymers and copolymers, polyethylene, polyvinyl acetate, polymethyl methacrylate; textile fabrics; glass; wood and metals.

In applying a solution to paper, films, fabrics or to the surfaces of rigid substrates such as glass, wood or metals, the solution may be sprayed, brushed, applied by a roller or an immersion coater, flowed over the surface, picked up by immersion or spread by other means. Complete coverage of the substrate may be attained or a pattern of the light-sensitive composition may be printed on the substrate. In impregnating paper, for instance, such concentrations of solution and pick-up by the paper are made so as to provide from about 0.01 mg./in.$^2$ to about 5.0 mg./in.$^2$ of acylated leuco dye and the equivalent amount of photooxidant. Images of greater and lesser intensity of color are provided by the application of greater and lesser amounts of leuco dye to the substrate.

The leuco dye and the photooxidant of the invention may be mixed in mole ratios within the range from about 10:1 (leuco dye:photooxidant) to about 1:10. The preferred range is 2:1 to 1:2, while the preferred ratio is about 1:1.

The binder may be used in an amount varying from about 0.5 part to about 200 parts by weight of the combined weight of the leuco dye and the biimidazole photooxidant.

The substrates bearing the solution of the leuco dye and biimidazole, and optionally a binder, may be dried simply at room temperature. They may also be dried under vacuum at room temperature or at elevated temperatures. The upper temperature limit is critical in combination with exposure time. A short exposure to heat of 90° C. may not be detectably harmful, while several hours exposure to this heat may reduce the light-sensitivity of the composition.

Any convenient source of ultraviolet light may be used to activate the light-sensitive composition and induce the formation of an image. Among the light sources which have been employed are a sun lamp, an electronic flash gun, a germicidal lamp, ultraviolet lamps providing specifically light of short wavelength (2537 A.) and lamps providing light of long wavelength (3663 A.). The light exposure time will vary from a fraction of a second to several minutes depending upon the intensity of the light, its distance from the light-sensitive composition, the nature and amount of the light-sensitive composition, and the intensity of color in the image desired. In general, light sources that supply radiation in the region between about 2000 A. to about 4200 A. are useful in producing images with the leuco dye-photooxidant solvent compositions on numerous sbstrates.

Images may be formed by a beam of light or by exposure to light of a selected area behind a negative, a stencil, or other relatively opaque pattern. The negative may be a silver negative with cellulose acetate or polyester film. The negative may also be one in which the opacity results from aggregations of areas of different refractive index. Image formation may be also accomplished in conventional diazo printing apparatus.

The range of activating radiation may be extended to longer wavelengths by adding certain dyes to the photosensitive composition. Such dyes function as sensitizers as is well known in the art. An extensive discussion of sensitizers is given by C. E. Kenneth Mees in his book "The Theory of the Photographic Process," The MacMillan Company, New York (1952), pages 961 to 1083.

The light-sensitive compositions of this invention have significant utility in a variety of applications. Among these are:

(1) Printing applications.—Very soft paper, as for example tissue paper, can be easily imaged when it has been treated with the subject photosensitive composition, by projecting an image onto the treated surface.

(2) Radiation dosimeters.—Paper or plastic film may be impregnated or coated with the subject photosensitive compositions and these may be used to determine the quantity of solar radiation that falls on a particular surface.

(3) Layout for metal working.—The photosensitive composition may be applied to a metal surface when suitably formulated as a paint or a lacquer. The metal surface may then be marked by irradiation through a suitable template to produce an image. The image may correspond to holes which are to be drilled or other operations of metal working and manufacture. This technique is particularly valuable when the metal to be marked has an irregular shape.

(4) Blueprints.—When applied to paper or plastic films, the light-sensitive compositions of this invention can find application in diazo printout equipment.

Representative examples illustrating the present invention follow.

In 25 ml. of a 50:50 mixture by volume of ethanol and N,N-dimethylformamide contained in a quartz test tube were dissolved 0.0005 mole (0.0178 g.) of 10-benzoyl-3,7-bis(dimethylamino)phenothiazine and 0.0005 mole of the photooxidants listed below. The quartz tube and its contents were irradiated for 60 seconds at a distance of 10 inches from a 275 watt sun lamp. An intense permanent blue color formed.

Photooxidant (1) Dimer of 2-(p-bromophenyl)-4,5-diphenylimidazolyl
(2) Dimer of 2-(o-chlorophenyl)-4,5-bis(p-methoxyphenyl)imidazolyl
(3) Dimer of 2-(o-chlorophenyl)-4-(1-naphthyl)-5-phenylimidazolyl
(4) Dimer of 4,5-bis(o-chlorophenyl)-2-phenylimidazolyl
(5) Dimer of 2-(p-methoxyphenyl)-4,5-diphenylimidazolyl
(6) Dimer of 4,5-bis(p-methoxyphenyl)-2-phenylimidazolyl
(7) Dimer of 2,4,5-tris(p-methoxyphenyl)imidazolyl
(8) Dimer of 2-(1-naphthyl)-4,5-diphenylimidazolyl
(9) Dimer of 4,5-diphenyl-2-(p-phenylsulfonylphenyl)imidazolyl
(10) Dimer of 2,5-diphenyl-4-o-tolylimidazolyl
(11) Dimer of 2-phenyl-4,5-di-o-tolylimidazolyl In the above examples, the same intense blue color is obtained on irradiation is a 50:50 mixture by volume of ethanol and benzene.

When the following photooxidants are substituted for the photooxidants of the preceding examples, an intense blue color is formed on irradiation.

(12) 1,2′-bibenzotriazole
(13) 1-diacetylaminobenzotriazole
(14) 1-diacetylaminopyrazole
(15) Tetraacetylhydrazine
(16) Tetraphenylhydrazine
(17) Bis(2-benzothiazolyl) disulfide In 50 ml. of a 20:80 mixture by volume of N,N-dimethylformamide and ethanol were dissolved 0.0005 mole (0.302 g.) of the dimer of 2-(o-chlorophenyl)-4,5-diphenylimidazolyl and 0.0005 mole of various leuco dyes listed below. The resultant solution was used to saturate a piece of filter paper to provide a pickup on the paper of about 0.6 mg./in.$^2$ of the imidazolyl dimer and of about 0.4 mg./in.$^2$ of the leuco dye. The treated paper was dried under a 250 watt infrared lamp at a distance of seven inches for 10 minutes. It was then exposed through a stencil to ultraviolet light for five seconds to 120 seconds under a lamp (H85A3/UV supplied by the General Electric Co.) at a distance of 7.5 inches. T lightly to intensely blue colored image formed depending upon the time of exposure and the chemical structure of the leuco dye.

Leuco dye

(18) 10-benzoyl-3,7-bis(dimethylamino)phenothiazine
(19) 10-(p-methoxybenzoyl)-3,7-bis(dimethylamino) phenothiazine
(20) 10-(p-chlorobenzoyl)-3,7-bis(dimethylamino) phenothiazine
(21) 10-(p-nitrobenzoyl)-3,7-bis(dimethylamino) phenothiazone
(22) 10-propionyl-3,7-bis(dimethylamino)phenothiazine When the following leuco dyes are substituted for those of the preceding composition examples, followed by impregnating paper therewith, similar colored images form when irradiated in the same manner.

(23) 10-benzoyl-3,7-bis(dimethylamino)-5,10-dihydro-5-phenylphenazine
(24) 10-(4-acetoxybenzoyl)-3,7-bis(dibutylamino)-5-ethyl-5,10-dihydrophenazine
(25) 12-(4-phenylthiobenzoyl)-5,9-bis(diethylamino)-7,12-dihydro-7-phenylbenzo[a]phenazine
(26) 10-(2-furoyl)-3,7-bis(diethylamino)phenoxazine
(27) 12-stearoyl-5,9-dimethylamino-12H-benzo[a]phenoxazine The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A light-sensitive composition comprising an intimate admixture of (1) a leuco dye having the formula

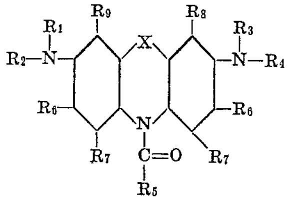

wherein $R_1$, $R_2$, $R_3$ and $R_4$ may be alike or different and are selected from the group consisting of $C_1$ to $C_4$ alkyl, phenyl and benzyl; $R_5$ is selected from the group consisting of $C_1$ to $C_{18}$ alkyl, $C_1$ to $C_5$ alkoxy, 2-furyl, 2-thienyl, aryl and aryl bearing one or two substituents selected from the group consisting of bromine, chlorine, fluorine, cyano, nitro, alkyl, alkylthio, alkoxy, alkoxycarbonyl, alkanoyl, alkanoyloxy, alkanamido, alkylsulfamoyl, benzyl, benzoyl, phenyl, phenoxy, and phenylthio, said alkyl and "alk" groups containing one to five carbon atoms; $R_6$ and $R_7$ are selected from the group consisting of hydrogen, methyl, and the radical needed to form a benzo ring; $R_8$ and $R_9$ are selected from the group consisting of hydrogen, methyl and nitro; and X is selected from the group consisting of O, S, and N—$R_{10}$, where $R_{10}$ is selected from the group consisting of ethyl, methyl and phenyl and (2) a non-volatile, nitrogen-containing photooxidant of such a character that the heretofore defined leuco dye of (1) and the photooxidant produce color when about 10 mgs. of each of these compounds are mixed together in 10 ml. of a 50:50 mixture of ethanol and N,N-dimethylformamide in a quartz vessel and irradiated with light having a wavelength of from about 2000 A. to about 4200 A.

2. A light-sensitive product comprising a supporting base carrying a light-sensitive composition according to claim 1.

3. Paper treated with a light-sensitive composition as heretofore defined in claim 1.

4. A film treated with a composition of claim 1.

5. The composition of claim 1 wherein the photooxidant component (2) is selected from the class consisting of hexaarylbiimidazoles, tetraarylhydrazines, tetraacylhydrazines, diacylaminobenzotriazoles, benzothiazole disulfides, triacylhydroxylamines( diacylaminopyrazoles and bibenzotriazoles.

6. The composition of claim 1 wherein the photooxidant component (2) is a hexaphenylbiimidazole wherein each phenyl group can be substituted with up to three substituents selected from the class consisting of alkyl, alkoxy, alkoxycarbonyl, alkylthio, dialkylcarbamoyl, dialkylsulfamoyl, alkanoyloxy, N-alkylalkanamido, aryl, aryloxy, arylthio, benzo, halogen, cyano and nitro.

7 A composition according to claim 1 wherein the leuco dye is 10-benzoyl-3,7-bis-(dimethylamino)phenothiazine and the photooxidant is a dimer of 2-(o-chlorophenyl)-4,5-diphenylimidazolyl.

8. A process for forming a colored material which comprises irradiating the light-sensitive composition as heretofore defined in claim 1 with light having a wavelength of from about 2000 A. to about 4200 A.

References Cited

UNITED STATES PATENTS

| | | | |
|---|---|---|---|
| 2,712,507 | 7/1955 | Green | 260—243 |
| 3,042,515 | 7/1962 | Wainer | 96—90 |
| 3,082,086 | 3/1963 | Sprague | 96—90 |
| 3,079,258 | 2/1963 | Agruss | 96—90 |
| 3,284,205 | 11/1966 | Sprague et al. | 96—90 |
| 3,285,744 | 11/1966 | Sprague et al. | 96—90 |

FOREIGN PATENTS

| | | |
|---|---|---|
| 788,384 | 1/1958 | Great Britain. |
| 788,390 | 1/1958 | Great Britain. |
| 791,426 | 3/1958 | Great Britain. |
| 917,919 | 2/1963 | Great Britain. |

NORMAN G. TORCHIN, *Primary Examiner.*

C. E. DAVIS, *Assistant Examiner.*